United States Patent

Baumann et al.

[15] 3,645,821
[45] Feb. 29, 1972

[54] METHOD FOR CONNECTING FOAMED MATERIALS TO THERMOPLASTIC BODIES

[72] Inventors: Manfred Baumann, Heerbrugg; Alois Stahli, Diepoldsau, both of Switzerland

[73] Assignee: Baumann AG, Diepoldsau, Switzerland

[22] Filed: June 3, 1969

[21] Appl. No.: 830,044

[52] U.S. Cl. ..........................156/196, 15/244 R, 156/298, 156/303.1, 156/306
[51] Int. Cl. ............................................................B32b 3/06
[58] Field of Search ....................15/244; 156/298, 306, 308, 156/303.1, 196

[56] References Cited

UNITED STATES PATENTS

| | | | |
|---|---|---|---|
| 1,924,337 | 8/1933 | Troupa | 15/244 CA |
| 3,323,966 | 6/1967 | Schimmel | 156/298 |

*Primary Examiner*—Carl D. Quarforth
*Assistant Examiner*—E. E. Lehmann
*Attorney*—Werner W. Kleeman

[57] ABSTRACT

There is disclosed a method for connecting a thermoplastic handle, grip or container with a sponge or foamed material. This method enables a sponge to be adequately secured to the thermoplastic member. Articles produced according to this invention are advantageously used in the application and spreading of a detergent composition (in liquid or paste form) upon a surface.

7 Claims, 6 Drawing Figures

PATENTED FEB 29 1972 3,645,821
Fig. 1
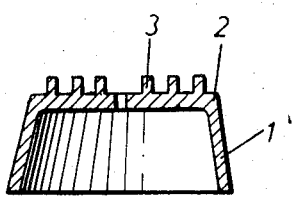
Fig. 3
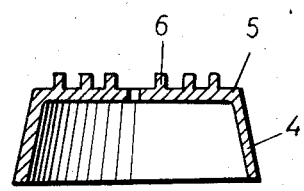
Fig. 2
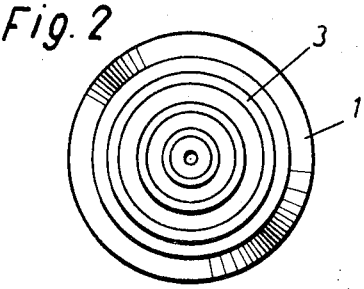
Fig. 4
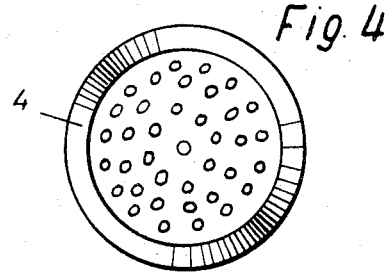
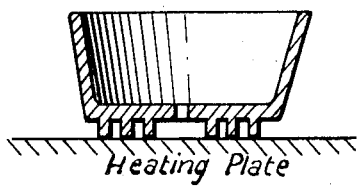
Fig. 5
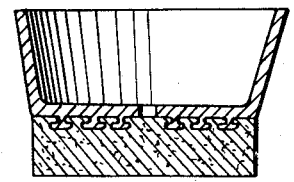
Fig. 6
INVENTORS
MANFRED BAUMANN &
ALOIS STAHLI
BY Jacobi, Davidson & Kleeman
ATTORNEYS

METHOD FOR CONNECTING FOAMED MATERIALS TO THERMOPLASTIC BODIES

BACKGROUND OF THE INVENTION

The present invention relates generally to a method for connecting a thermoplastic body with a part made of a sponge or foam material. The articles made according to this invention may be used in the application and spreading of a liquid or paste (e.g., cleaning agent or detergent compositions) upon a surface. More particularly, this invention relates to the method for connecting a body made of thermoplastic with a foam matter or sponge material which is used for the spreading or application of a detergent composition or cleaning agent on a surface.

Nowadays, cleaning agents are generally sold in liquid or paste form. To this end, there are generally used containers equipped with a sponge or foamed material or to which such sponge is added. The sponges themselves mostly consist of plastics which are processed to a foamed material.

Such a sponge which serves to apply and distribute the cleaning agent and typically is attached to a plastic member has found wide acceptance for the application of a liquid to a surface. To facilitate ease in handling, as a general rule, such sponge is connected with a solid thermoplastic member serving as a support or handle. However, a problem with such articles exist when they are used for the application of a detergent composition to a surface. More particularly, many problems have resulted depending on how the sponge has been secured to the plastic body.

One method of securing the sponge to the plastic body involves the clamping of the sponge on to the plastic member. This can be achieved in a very simple manner if the plastic member is in the form of a circular cylinder or a circular disc. The cylindrical member is provided with a threading onto which a matching ring is screwed. The latter has an angular or flexed edge into which the sponge (which also is in the shape off a round circular cylinder or disc, but with a protruding edge), is pressed onto the plastic member. Aside from the relatively expensive type of connection employed, this type of connection has one serious drawback in that it can disconnect itself when in use. Moreover, since the support part for this sponge is larger than the diameter of the sponge itself, it is very difficult for the sponge to reach areas which are not reasonably accessible, or areas which cannot be reached at all.

Another method which is also known involves the use of attaching the sponge to the plastic part by means of an adhesive or glue. This method is simpler with respect to construction and is more convenient in use than a connection which employs clamping the sponge to the thermoplastic member. However, this method also has drawbacks. As a practical matter, each adhesive used for connecting the sponge with the plastic part may be dissolved by means of a solvent since most detergent compositions which are applied to a surface, usually contain one or more solvents therein. It is due to the presence of these solvents which dissolve the adhesives which are employed for the connecting of the sponge to the plastic part. Thus, in the course of use, such bonded sponges usually disconnect themselves from the plastic member, especially when the bonding is subjected to increased mechanical stress during the application and spreading of the detergent composition. A further drawback is that the adhesives usually require a long period of time for hardening, thus resulting in a somewhat inefficient process.

Another means of connecting the sponge of foam material with the plastic member involves the fusing of the sponge onto the foam material. This would obviate the drawbacks with respect to the clamping and bonding methods. However, the difficulties of obtaining a perfect connection are great, since the surface of the plastic part, i.e., the sponge support or holder, must be liquefied. Yet, during this liquefication phase the sponge support itself must not heat up to such an extent where it will also become soft and thereby deformed. This is a factor which cannot be controlled, particularly when dealing with large-surface sponge supports.

SUMMARY OF THE INVENTION

There thus remains a need for providing a suitable method for connecting bodies made of thermoplastic with parts made of foam material in order that the latter can be used for the application of and spreading of cleaning agents on a surface. Specifically, it is therefore a primary object of this invention to provide an effective method for attaching a sponge or foam material to a plastic member in a simple and economical manner.

Consistent with this primary object, it is a further object hereof to improve upon the drawbacks of the various methods and in particular, to create a method which utilizes the advantages attending the fusion process and which provides for a perfect connection even with large-surface sponge supports with simultaneous economy of production.

The method, according to this invention, includes the steps of providing a bonding surface of a thermoplastic member possessing elevations. Heat is then applied for a period of time sufficient to render only said elevations soft and liquid, with the remainder of the thermoplastic member retaining its original physical state since it is only slightly raised in temperature. Thereafter, the elevations are pressed onto the unheated surface of the foamed material, causing the elevations to deform during such process and bond themselves with the foamed material part as they harden.

The member for carrying out this method in accordance with this invention is characterized in that the surface which connects the plastic part with the foamed material part has a number of elevations which form an anchor with the foamed material part.

BRIEF DESCRIPTION OF THE DRAWING

The invention will be better understood, and objects other than those set forth above, will become apparent, when consideration is given to the following detailed description. Such description makes reference to the annexed drawings presenting preferred illustrative embodiments of the invention, and wherein:

FIG. 1 is a cross-sectional view of the plastic part used for the sponge support;

FIG. 2 is a top plan view, of the plastic support shown in FIG. 1;

FIG. 3 is a cross-sectional view of another embodiment of the plastic part used for the sponge support;

FIG. 4 is a top plan view of the plastic support shown in FIG. 3;

FIG. 5 is a cross-sectional view of a sponge support on the heating device; and

FIG. 6 is a cross-sectional view of a sponge support similar to FIG. 1 except that a sponge is secured thereon.

DESCRIPTION OF THE PREFERRED EMBODIMENTS

In FIG. 1, reference number 1 identifies the sponge support which is made of a thermoplastic. By thermoplastic, we refer to any of the well-known synthetic resins that may be softened by heat, and then regain their original properties upon cooling. The various thermoplastics than can be employed would be readily apparent to those skilled in the art. Examples of thermoplastics include the following, but are not limited thereto: polyvinyl resins, polystyrene resins, and acrylate resins. The sponge support is slightly conical in shape and constructed as a hollow body. Annular elevations 3, which are provided concentrically around the vertical axis of sponge support 1, are found on level surface 2 which comes into contact with the sponge.

FIGS. 3 and 4 show a sponge support 4 of similar shape as shown in FIGS. 1 and 2. Instead of the annular or ring-shaped elevations 3 provided at the planar bonding surface 2 of FIG. 1, here there is a plurality of individually spaced pins or bolts 6 which are distributed along the bonding surface 5 of the member to which the foamed material is to be attached.

The elevations or raised portions are either in the form of concentric annular ribs 3 (FIG. 1) or bolts 6 (FIG. 3) which are insulated and distributed on the bonding surface, and said elevations are provided at the contact surface with the sponge or foam material. These elevations are found on the surfaces 2 and 5 of the sponge supports 1 and 4, respectively, and they serve to produce a connection which possesses outstanding bonding or adhering properties between the plastic part and the foam matter or sponge part with the aid of a fusing operation.

The term "foam or foamed material" as used in the specification and claims, refers either to a sponge or to any foamed synthetic plastic material which possesses spongelike characteristics.

Method For Connecting Sponge Support and Sponge

The sponge supports are placed directly, with the raised portions or elevations (i.e., the annular ribs 3 or the bolts 6) onto a suitable heating device, such as the heating plate shown in FIG. 5. The ribs and the pins or bolts, respectively, heat up very quickly as a result of this direct contact and become soft and almost liquid before the bottom of the sponge support, whose volume is many times larger than the volume of the ribs and bolts, increases its temperature substantially. When the annular ribs and the bolts, respectively, have become liquid, the sponge support is lifted off the heating plate and pressed into the cold sponge. During this operation they deform and bond themselves with the foamed material part during hardening. If the foamed material part is likewise made out of a thermoplastic, the heated elevations of the foamed material support will cause those portions of the foamed material or sponge, with which they come into contact, to liquefy initially. However, the heated elevations will dig a recess into the sponge material, thus enabling a satisfactory connection to be achieved. When the heated elevations harden on the surface, they form a bond with the foamed material or sponge and harden on account of the exerted pressure since they are still liquid in their center or nucleus, and thus assume a substantially T-shaped profile or mushroom shape, respectively, as shown in FIG. 6 in schematic representation. In this manner, one obtains a perfect bonding between foamed material and foamed material support by means of a fusing operation with foamed or sponged material being additionally clamped between the deformed elevations.

It is believed that it will be readily apparent from the foregoing description that the bonding method previously described accomplishes the objects as set forth at the beginning of the description.

What is claimed is:

1. A method for bonding a thermoplastic member with a component formed of foamed material, comprising the steps of shaping elevations on a bonding surface of said thermoplastic member, applying heat for a period of time sufficient to render said elevations soft and plastic, and thereafter pressing said elevations onto an unheated surface of said foamed material, and deforming said elevations during such process such that the thus deformed elevations bond themselves with the foamed material component as they harden.

2. A method according to claim 1, including the step of delivering heat to said elevations by placing such elevations in contact with a heating plate.

3. A method according to claim 1, wherein the step of pressing the heated elevations against a surface of said foamed material at least partially liquefies said surface and causes said surface to fuse with said elevations.

4. A method according to claim 2, wherein the step of pressing the heated elevations against a surface of said foamed material at least partially liquefies said surface and causes said surface to fuse with said elevations.

5. A method according to claim 2, wherein the step of pressing the heated elevations against a surface of said foamed material causes said elevations to become deformed and possess a substantially T-shaped configuration.

6. A method according to claim 2, wherein the step of pressing the heated elevations against the surface of said foamed material causes said elevations to become deformed and possess a substantially mushroom shape.

7. A method of directly bonding a thermoplastic member with a component formed of foamed material, comprising the steps of forming elevations at a bonding surface of the thermoplastic member, applying heat to the elevations for a period of time sufficient to render such soft and plastic, then pressing such elevations which are now in a plastic condition against a surface of the foamed material to which the thermoplastic member is to be directly bonded, deforming such elevations during this pressing operation, cooling the deformed elevations and directly bonding such elevations with the foamed material component as these elevations harden during cooling.

* * * * *